(12) United States Patent
Anderson et al.

(10) Patent No.: US 7,993,096 B2
(45) Date of Patent: Aug. 9, 2011

(54) WIND TURBINE WITH ADJUSTABLE AIRFOILS

(75) Inventors: Donald E. Anderson, Northfield, MN (US); Daniel W Christian, Waseca, MN (US)

(73) Assignee: Tom Heid, Eagan, MN (US)

( * ) Notice: Subject to any disclaimer, the term of this patent is extended or adjusted under 35 U.S.C. 154(b) by 35 days.

(21) Appl. No.: 12/509,236

(22) Filed: Jul. 24, 2009

(65) Prior Publication Data

US 2011/0020123 A1    Jan. 27, 2011

(51) Int. Cl.
    *F03D 7/06*    (2006.01)
(52) U.S. Cl. ............ 415/4.2; 416/17; 416/111; 416/119
(58) Field of Classification Search .................. 415/4.2, 415/4.4; 416/9, 17, 110, 111, 108, 119, 170 R
    See application file for complete search history.

(56) References Cited

U.S. PATENT DOCUMENTS

| | | | |
|---|---|---|---|
| 4,278,894 A * | 7/1981 | Ciman | 290/44 |
| 4,302,684 A | 11/1981 | Gogins | |
| 4,832,569 A | 5/1989 | Samuelson et al. | |
| 5,676,524 A * | 10/1997 | Lukas | 416/17 |
| 6,320,273 B1 * | 11/2001 | Nemec | 290/55 |
| 7,040,858 B2 * | 5/2006 | Suzuki | 415/4.2 |
| 2009/0136346 A1 * | 5/2009 | Kelly | 416/131 |

* cited by examiner

*Primary Examiner* — Justine R Yu
*Assistant Examiner* — Ryan H Ellis
(74) *Attorney, Agent, or Firm* — Gary L. Huusko

(57) ABSTRACT

The present invention concerns a wind turbine having a plurality of vertically extending airfoils forming a rotating carousel rotating about a central axis thereof. The airfoils pivot about their leading edges to adjust the pitch angle thereof to maximize energy harvest when the airfoils are rotating both in an upwind direction and in a down wind direction. This pivoting movement results from trailing edges of the airfoils being pivotally secured to rigid spokes or cables of a trailing edge hub. An adjustment mechanism is pivotally mounted between a carousel hub and the trailing edge hub and is used to control the separation between a central axis of the trailing edge hub and the axis of rotation of the carousel as they co-rotate. As the carousel rotates, the offset distance between the two axes determines the maximum achievable pitch angle of each airfoil. The airfoils then continually cycle between a positive and negative value of the maximum pitch angle so that each airfoil is at its most desirable pitch angle relative to its position around the carousel and relative to the existing wind direction in order to create maximum lift. A wind direction rudder is secured to the adjustment mechanism to provide for movement thereof resulting in movement of the trailing edge hub as wind direction changes so that the most desirable pitch angle of the airfoils relative to wind direction is maintained.

12 Claims, 12 Drawing Sheets

WIND TURBINE WITH ADJUSTABLE AIRFOILS

FIELD OF THE INVENTION

The present invention relates generally to wind powered energy generating devices and in particular to wind power generating devices of the vertical axis airfoil type.

BACKGROUND OF THE INVENTION

Wind turbines used to generate electrical power are well known in the art and can be divided into two main categories relative to their axis of rotation. Thus, vertical axis wind turbines (VAWT's) have a plurality of blades or airfoils rotating about a vertically extending axis and horizontal axis wind turbines (HAWT's) having the blades or "propellers" thereof rotating about a horizontally extending axis. There exist advantages and disadvantages with each type. Current art HAWT's are generally more efficient at extracting electrical power from a given wind current, where for example, large wind generators in the megawatt range are exclusively of the horizontal type. However, in order to achieve efficient operation a HAWT is desirably mounted on a high tower to lift it and the blades thereof above air obstructions that create turbulent or obstructed wind flow that hinder its performance. A HAWT is also generally limited to two or three propellers which travel at high tip speed, well above the incident wind speed. The rotating shaft typically couples a generator to a gear box, both mounted to the tower and hence difficult to install and service. The propeller blades often use variable pitch to more efficiently harvest a major part of all the energy in the wind over the entire disk aperture swept by the blades As a result thereof, HAWT's can require powered assistance to initiate rotation once a minimal wind speed is sensed.

Conversely, VAWT's can have many individual blades allowing for operation in low wind speeds and do not have to be "facing" into the wind as initiation of rotation can occur from any wind direction. This ability to work immediately from any wind direction and in low wind speeds makes VAWT's more ideally suited for smaller low ground installations. A VAWT then obviates the cost of a high tower and reduces the difficulty of access to various turbine components for replacement or repair. VAWT's therefore hold out the possibility of providing a lower cost wind power alternative and for areas where an HAWT would not be suitable due to lower than required average wind speeds.

However, in VAWT's of the Savonius type the blades only produce power during half of their rotation and fight against the wind during the return half thereof. Thus, such VAWT's can not rotate at a speed greater than the wind speed thereby severely limiting their ability to harvest power from the available wind.

A Darrieus or "eggbeater" type VAWT's are known that produce power in both directions, but suffer from the fact that they often need assistance to get their rotation started.

A third type of VAWT, sometimes referred to as a Gyromill, uses airfoils rotating around a vertical axis that also provide power through each full rotation. Frequently the vanes are designed to provide adequate torque to provide for self start-up at zero rotational velocity, but due to their inherent large amount of drag are limited in the peak attainable velocity. In some designs airfoil orientation can be maximized for start-up and then adjusted for high speed running. It is also known to cycle or vary the angle of attack as the vane moves from the "upwind" to the "downwind" part of the rotational path to improve wind energy harvest performance. However, a major problem therewith concerns the cost, complexity, increased maintenance and reduction of generation efficiency that result from the mechanisms that exist to provide for such airfoil adjustment.

Accordingly, it would be desirable to have a VAWT that can maximize the ability to harvest wind power through airfoil adjustment and do so with a mechanism that is simple, reliable and low in cost.

SUMMARY OF THE INVENTION

The present invention is of the VAWT type and provides for a simplified and compact yet robust mechanism for adjusting airfoil orientation and for doing so during the operation thereof. The invention herein includes a plurality of vertically extending symmetrical airfoils having a wider leading edge tapering to a thin trailing edge. Each airfoil is pivotally secured near its leading edge on a bottom end thereof to spoke arms extending from a lower central hub. The top ends thereof are also pivotally secured at the same leading edge point to the ends of upper spoke arms extending from an upper central hub. A central vertically extending drive shaft is secured to the bottom and top hubs of the upper and lower spoke arms forming a rotating airfoil carousel. A lower end of the central drive shaft provides for connection to a driven device, such as, an electrical generator, refrigeration compressor, fluid pump, and the like as well as to a base support structure.

A plurality of airfoil trailing edge spokes are pivotally secured to the top ends of each of the airfoils near the trailing edges thereof. The opposite ends of the trailing edge spokes are secured to a trailing edge angle adjusting hub. The trailing edge hub overlies the upper spoke arm hub wherein an airfoil angle adjusting mechanism is pivotally positioned there between.

The airfoil angle adjusting mechanism includes an electrically operated screw mechanism for rotating a threaded shaft for positioning a threaded carrier there along. An adjustment shaft is secured to the carrier and extends upwardly there from and centrally through the trailing edge pitch angle control central hub. A wind vane or rudder is secured to the adjustment shaft.

When the screw motor mechanism is at a zero position, the central axis of the trailing edge angle adjusting hub coextends with the axis of both the collinear upper and lower leading edge hubs and both rotate about that same axis. The invention herein is designed so that at this zero position the linear extension of the airfoils is parallel with lines tangent to the circle of rotation defined thereby. This designates a pitch angle of zero of the airfoils. Operation of the screw motor moves the pitch angle control hub and its associated trailing edge spokes relative to the upper leading edge spoke arms whereby the central axes thereof are separated by a distance D. This movement results in movement of the trailing edges of the airfoils by a pitch angle gamma relative to that zero position tangent line. If the distance between the central axes of the points of attachment of the leading edge spoke arms and their corresponding trailing edge spoke arms is denominated "C" the resultant pitch angle gamma has a maximum or gamma max ($\gamma_{MAX}$) that is equal to the arcsine of D/C.

In operation, those of skill will appreciate that the adjustment mechanism is held relatively motionless by virtue of its pivotal mounting and by connection to the rudder which is held in position by the wind direction at the particular time. It can also be understood that since the trailing edge hub and spoke structure is substantially rigid, airfoils positioned 180 degrees apart, that is, on opposite sides from each other, will have the opposite gamma angle. Thus, during any one rotation, on a first half of the turbine device herein the airfoils will have a positive gamma and on a second half thereof the airfoils will have a negative gamma. An angle theta is used to describe the 360 degrees of arc of one rotation of the airfoil carousel with a theta angle of zero degrees being the point there around facing directly into the wind. An airfoil at the zero theta position has a maximum gamma angle as does an airfoil position at a theta of 180 degrees however at a negative value of that gamma angle. As the wind direction changes the rudder will move accordingly thereby moving the adjustment mechanism and the trailing edge adjustment hub relative to the airfoil carousel. This movement serves to insure that the zero degree theta position is constantly directly facing the wind. As the airfoils rotate the eccentric positioning of the central axis of the trailing edge hub causes the airfoils to swing back and forth between the positive gamma angle and a negative gamma angle. The movement of the trailing edge of any one airfoil can be seen to describe a cosine wave function wherein gamma decreases from a maximum gamma angle at zero degrees theta to a zero gamma at 90 degrees, then to a negative gamma maximum at a theta of 180 degrees whereupon it then moves to a zero gamma at 270 degrees followed by a return to the maximum gamma as that airfoil completes one rotation back to a theta of zero.

The screw motor can be understood to regulate the distance D between the centers of the trailing edge adjustment hub and the carousel and thereby regulate the size of the angle gamma. That ability is critical for obtaining maximum performance of the wind turbine of the present invention. At start-up those of skill will understand that a large positive gamma is desirable to create an amount of aerodynamic drag whereby sufficient torque can be exerted against the airfoils to initiate rotation, particularly in a low wind condition. Once sufficient rotational speed is achieved, the angle gamma can be reduced to reduce drag and permit increased rotational speed.

An electronic control mechanism is connected to the screw motor and adjusts the angle gamma as a function of the wind speed and rotational speed of the carousel. In a preferred embodiment power for the electronic control and/or the screw motor is provided by solar cells having a rechargeable battery reserve.

It will be appreciated that the present invention has a number of advantages over the prior art. The adjustment mechanism being housed between the trailing edge adjustment hub and the upper carousel or leading edge hub serves to protect those components from the deleterious effects of weather. Additionally, that approach combined with the particular connection of the rudder to the adjustment shaft provides for a vertically compact mechanism and also one that is robust and durable.

BRIEF DESCRIPTION OF THE FIGURES

A better understanding of the structure, function, operation and the objects and advantages of the present invention can be had by reference to the following detailed description which refers to the following figures, wherein.

DETAILED DESCRIPTION

Figure 1:
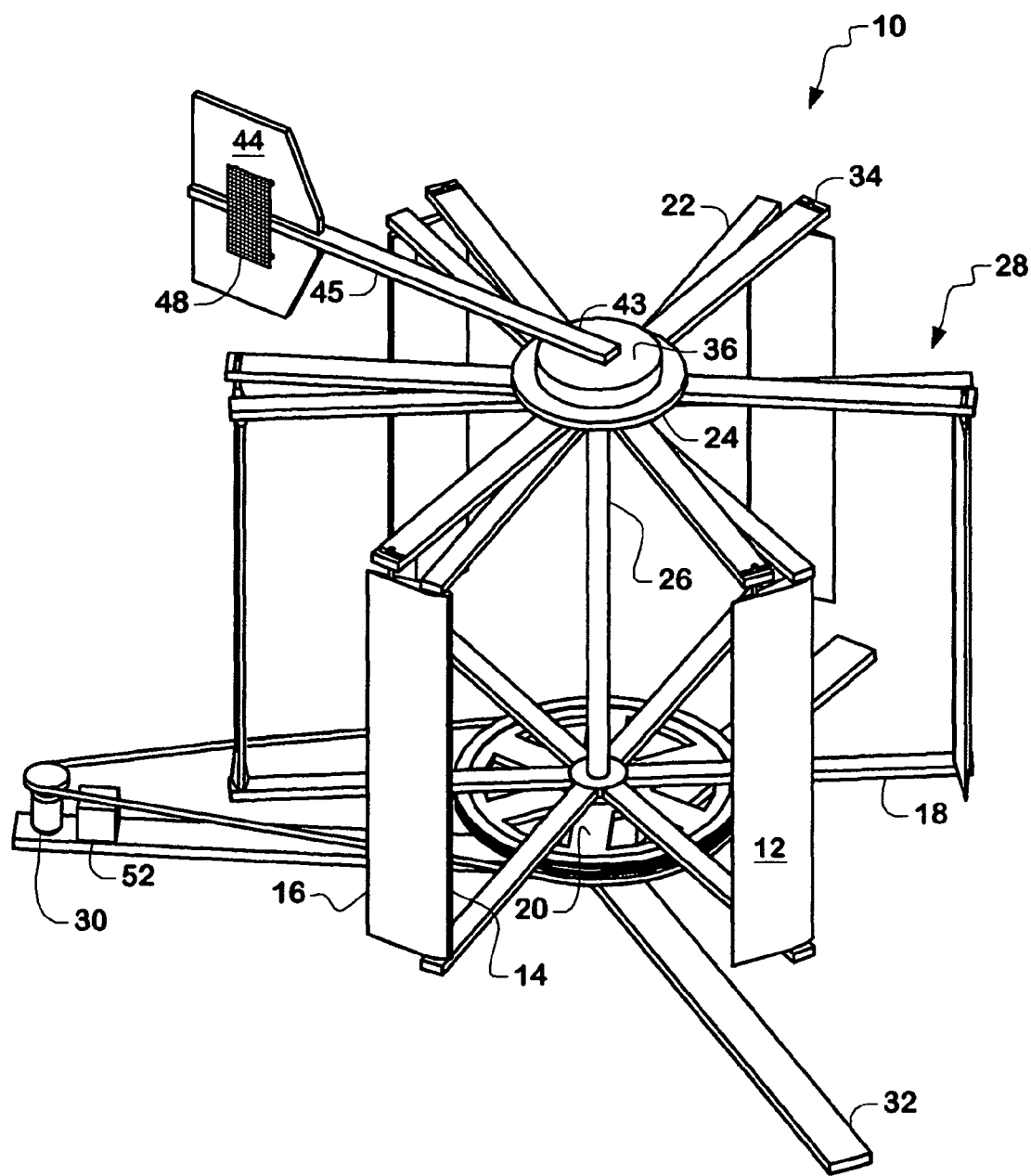
FIG. 1 shows a perspective view of the present invention.
Figure 2:
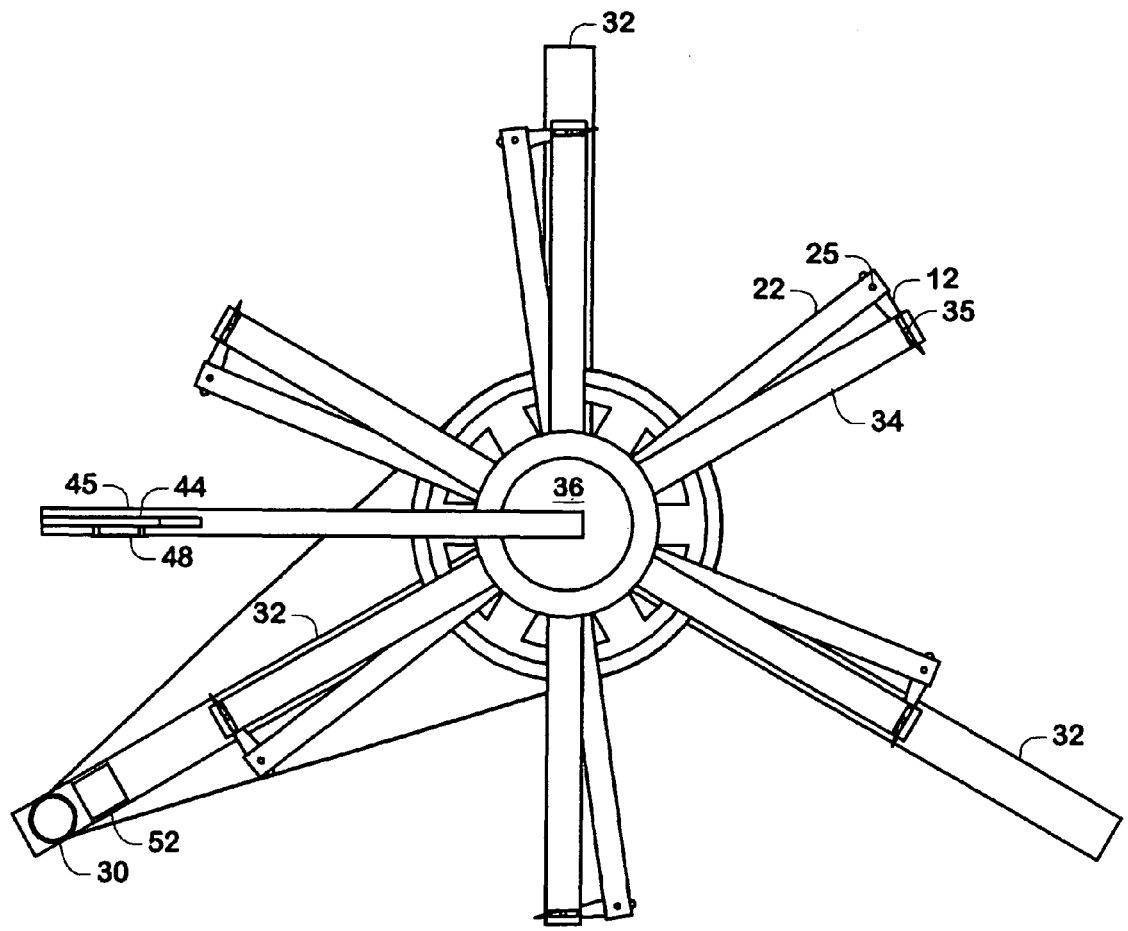
FIG. 2 shows a top plan view of the present invention.
Figure 3:
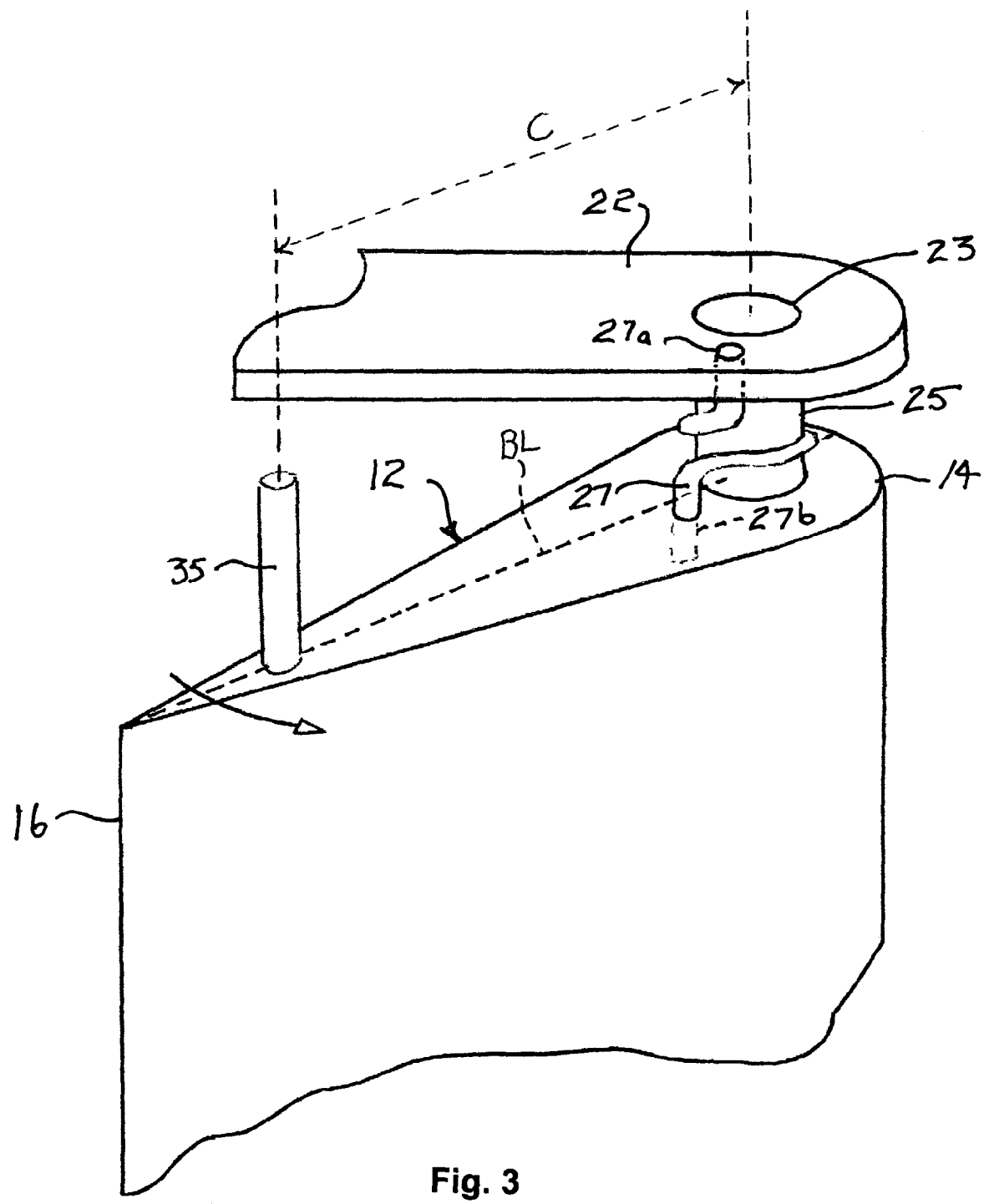
FIG. 3 shows an enlarged view of an airfoil top end.

As seen by referring to FIGS. 1 and 2, the wind turbine of the present invention is shown and generally referred to by the numeral 10. Turbine 10 includes a plurality of vertically extending airfoils 12 each having a leading edge 14 and a trailing edge 16. Each airfoil 12 is pivotally secured at its leading edge 14 on a bottom end thereof to spoke arms 18 extending from a lower central hub 20. The top ends of airfoils 12 are also pivotally secured at top ends thereof to the same point there along at the leading edge 14 to the ends of upper spoke arms 22 extending from an upper central hub 24. Specifically as seen in FIG. 3, each arm spoke 22 includes a hole 23 for insertion therein of a pin 25 extending from its corresponding airfoil 12 to provide for the stated pivotal connection there between. Additionally, a spring return mechanism includes a spring 27 extending around pin 25 and retained on one end thereof in a hole 27a of arm 22 and a hole 27b of airfoil 12.

A central vertically extending drive shaft 26 is secured to bottom and top hubs 20 and 24 respectively forming a rotating airfoil carousel 28. A lower end of drive shaft 26 provides for connection by a belt and pulley system to a driven device 30, such as, an electrical generator, refrigeration compressor, fluid pump, and the like as well as to a base support structure 32. Of course, driven device 30 could also be directly connected to shaft 26 where an armature or working shaft thereof co-rotates there with.

A plurality of airfoil trailing edge pitch angle adjustment spoke arms 34 are pivotally secured to pins 35 extending from the top ends of each of the airfoils 12 near trailing edges 16 thereof. Referring again to FIG. 3, a chord length C is defined by the distance between pins 25 and 35 along bisecting line BL. The opposite ends of trailing edge spoke arms 34 are secured to a trailing edge pitch angle adjusting central hub 36. Trailing edge pitch angle adjusting hub 36 overlies upper spoke arm hub 24 wherein a screw adjustment mechanism 37 is pivotally positioned there between.

Figure 4:
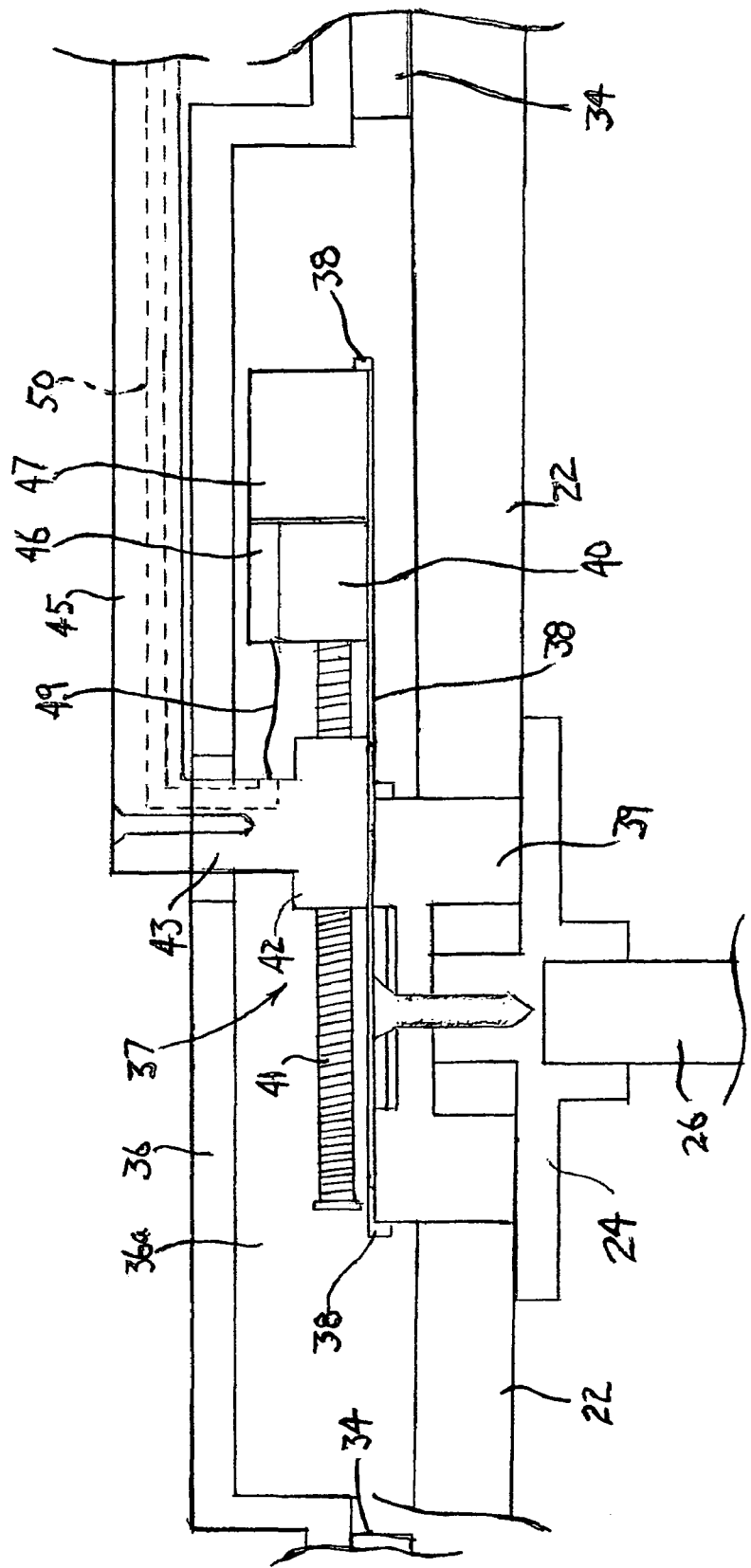
FIG. 4 shows an enlarged cross-sectional view of the upper central hub and the trailing edge cable central hub.

As seen in greater detail in FIG. 4, angle adjusting hub 36 serves to define an interior housing area 36a in which screw adjustment mechanism 37 is located. Mechanism 37 is positioned on a plate 38 which is positioned pivotally on and above a spacer hub 39. Hub 39 is secured to upper shaft hub 24 and rotates there with. Adjustment mechanism 37 includes an electrically operated drive motor 40 secured to plate 38 for rotating a threaded shaft 41 for positioning a threaded nut carrier 42 there along. An upwardly extending shaft 43 defines a central axis of angle adjusting housing 36 and is secured to carrier 42. A rudder 44 is secured to a rudder arm 45 which is, in turn, is secured to upwardly extending shaft 43. An electronic control 46 is used to regulate the operation of adjustment mechanism 37 and is powered by a rechargeable battery 47. Battery 47 is secured to plate 38 and is charged by photovoltaic solar cells 48 positioned on rudder 44 and connected thereto by wires 49. Wires 49 extend from cells 47 to battery 46 through a shaft 50 extending through rudder arm 44. Control 45 is secured to motor 40 communicates wirelessly with a sensor system 52 which provide information as to carousel rotational speed and load demand. An anemometer, not shown, provides information as to wind speed wirelessly to control 46.

Figure 5:
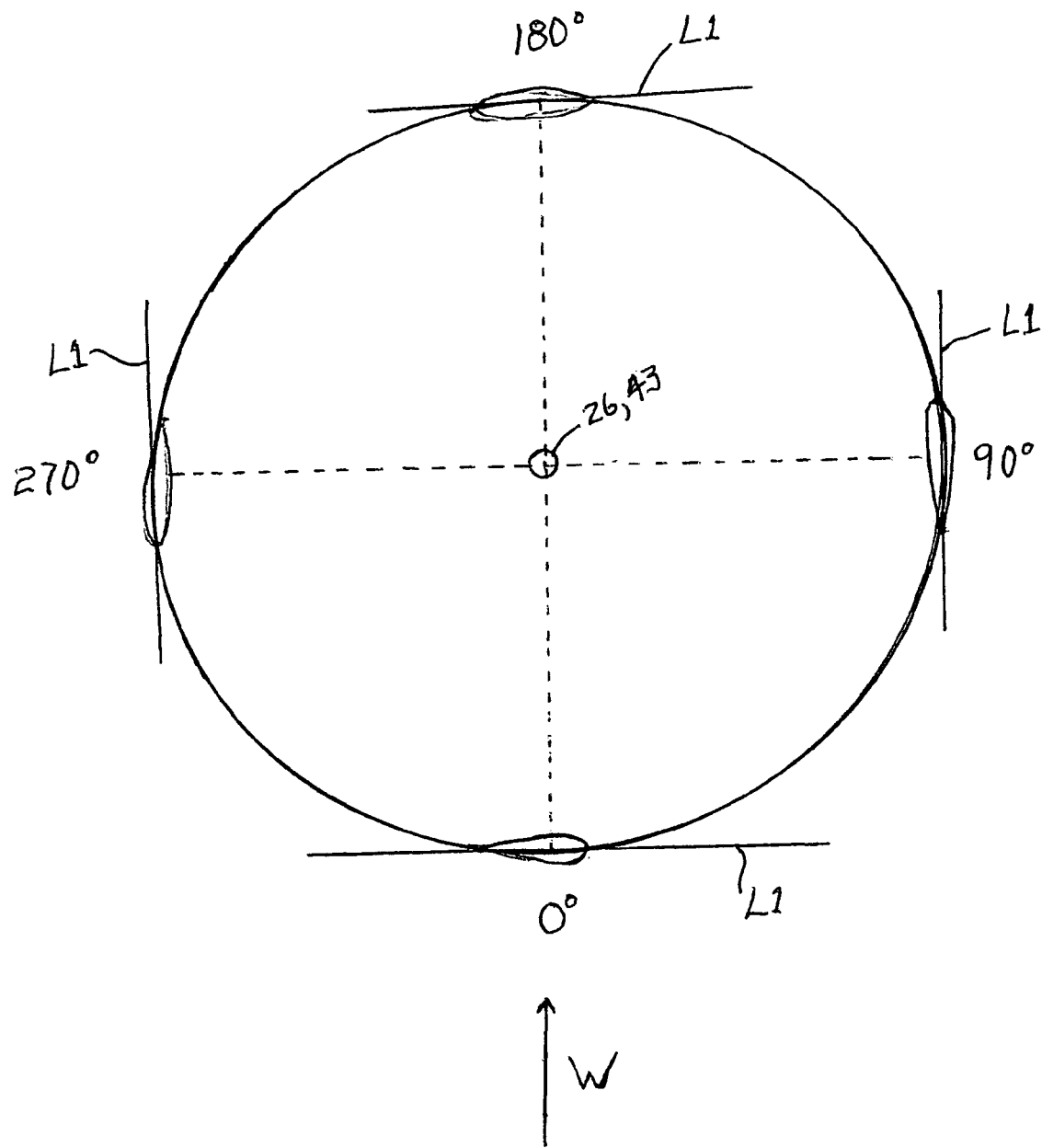
FIG. 5 shows a diagrammatic top plan view of the airfoils of the present invention having a zero axis offset.

When adjustment mechanism 37 is at a position zero the central axis defined around adjustment shaft 43 of trailing edge pitch angle adjustment hub 36 coextends with the axis of shaft 26 of both the collinear upper and lower leading edge arm hubs 24 and 20 respectively wherein both rotate about that same axis. As can be understood by referring to FIG. 5, the invention herein is designed so that at this zero position the pitch angle of the airfoils is zero wherein the linear extension thereof 12 is parallel with lines L1 tangent to the circle of rotation defined thereby.

Figure 6:
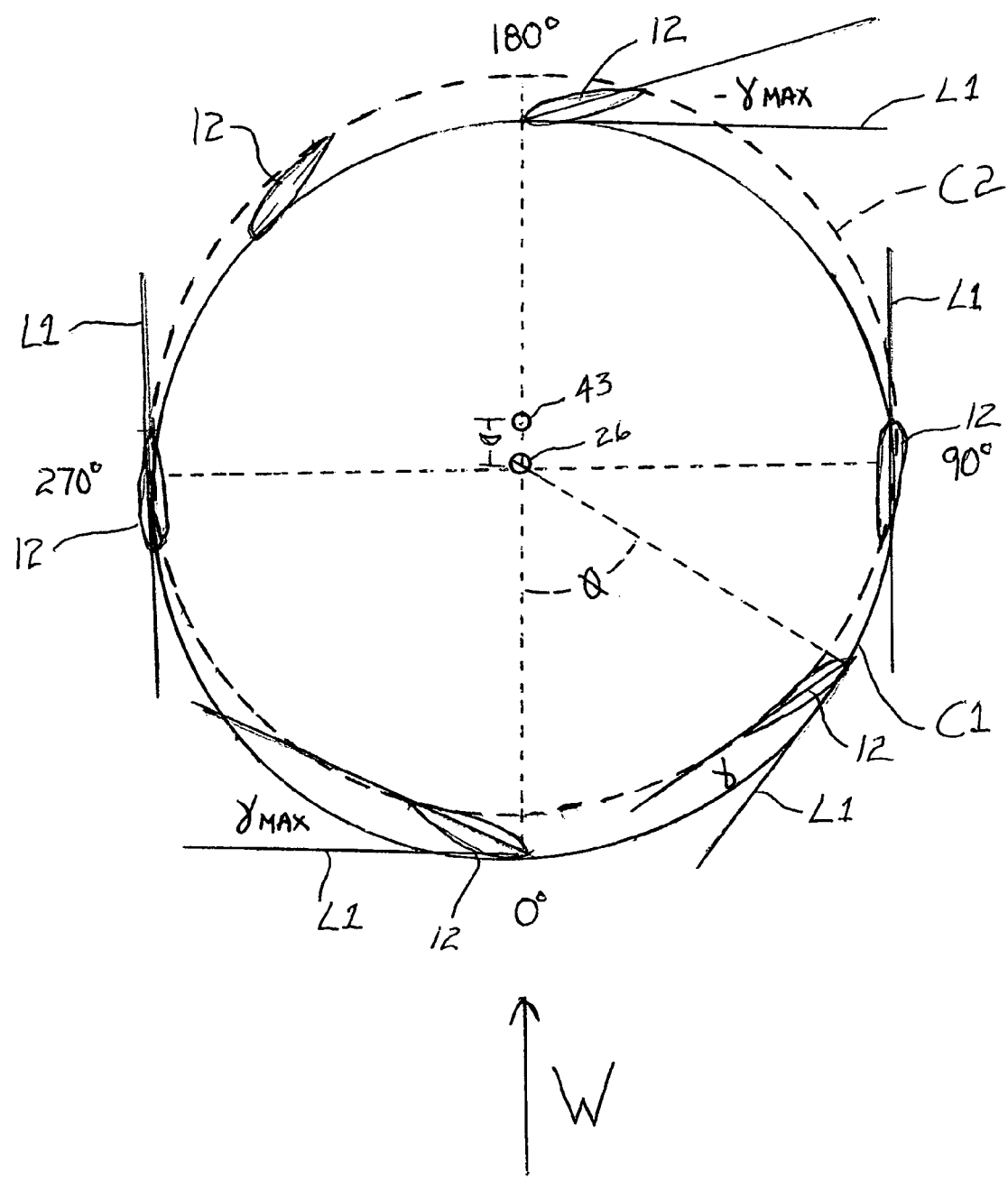
FIG. 6 shows a diagrammatic top plan view of the airfoils of the present invention having a positive axis offset.

Referring to FIGS. 4 and 6, it can be understood that operation of adjustment mechanism 37 moves trailing arm central hub 36 and its associated trailing edge arms 34 relative to upper carousel hub 24. Thus, the central axes thereof are separated by a distance D. Rotation of carousel 28 will then result in the leading edges 14 of airfoils 12 rotating around the central axis thereof and following the circle indicated as C1. However, the trailing edges 16 thereof will follow the circle indicated as C2. As carousel 28 rotates it can be appreciated that the offset of the circles C1 and C2 will result in a pivoting movement of airfoils 12 about their leading edges 14 as their trailing edges 16 move to extend outward and inward of carousel 28 following circle C2.

This movement of trailing edges 16 can be defined by a pitch angle gamma, indicated as γ, relative to lines L1 tangent to circle C1. The largest or maximum angle gamma ($\gamma_{MAX}$) is defined by the existing axial separation distance D. In the present invention adjustment mechanism 37 can provide for a wide range of angles gamma and preferably from a positive gamma angle of 90 degrees to a negative gamma angle of approximately 6 degrees. Those of skill will thus understand that the nomenclature ($\gamma_{MAX}$) in FIG. 6 refers to the maximum gamma angle achievable relative to a particularly selected offset distance D, as opposed to the largest value of gamma achievable by adjustment mechanism 37. Airfoils 12 rotate through an angle theta (θ) of 360 degrees for each revolution of carousel 28. Zero degrees theta is seen in FIG. 6 and is defined as the point on circle C1 that intersects with the diameter thereof and faces directly into the wind, which wind direction is defined by arrow W.

In operation, those of skill will appreciate that adjustment mechanism 37 is held relatively motionless by virtue of its pivotal mounting between hubs 36 and 24 and by connection to rudder 43 which is held in position by the wind direction at the particular time. As the wind direction changes rudder 43 will move accordingly thereby moving the adjustment mechanism 37 and the trailing edge angle adjustment hub 36 relative to carousel 28. This movement serves to insure that the zero degree theta position is constantly directly facing the wind. Therefore, as an airfoil 12 moves from an angle theta of zero through to a theta angle of 90 degrees, the gamma angle thereof reduces from the gamma max value to zero. As the airfoil 12 continues through to an angle theta of 180 degrees, its trailing edge moves in an opposite or negative direction reaching a negative gamma max ($-\gamma_{MAX}$). Continuing around, airfoil trailing edge 16 will move causing the negative gamma max to return to a zero gamma angle when theta equals 270 degrees. As one full rotation is completed back to theta equal to zero, the airfoil trailing edge 16 moves so that the gamma angle defied thereby increases back to gamma max ($\gamma_{MAX}$), after which the entire process is repeated for each rotation of carousel 28. As airfoils 12 rotate, the eccentric positioning of the central axis of trailing edge hub 36 causes the airfoils to swing back and forth between a positive gamma angle and a negative gamma angle. The movement of a trailing edge 14 of any one airfoil 12 can be seen to describe a cosine wave function wherein gamma decreases from gamma max at zero degrees theta to a gamma of zero at 90 degrees, then to a negative gamma max at a theta of 180 degrees whereupon it then moves to a zero gamma at 270 degrees followed by a return to a positive gamma max as that airfoil completes one rotation back to a theta of zero. It will be apparent that the purpose of alternating the position of the trailing edges 16 or the airfoils 12 as they rotate around a down wind half of carousel 28 and an upwind half thereof is to achieve maximum aerodynamic lift in both directions in order to extract maximum power from the existing wind energy resource.

Figure 7:
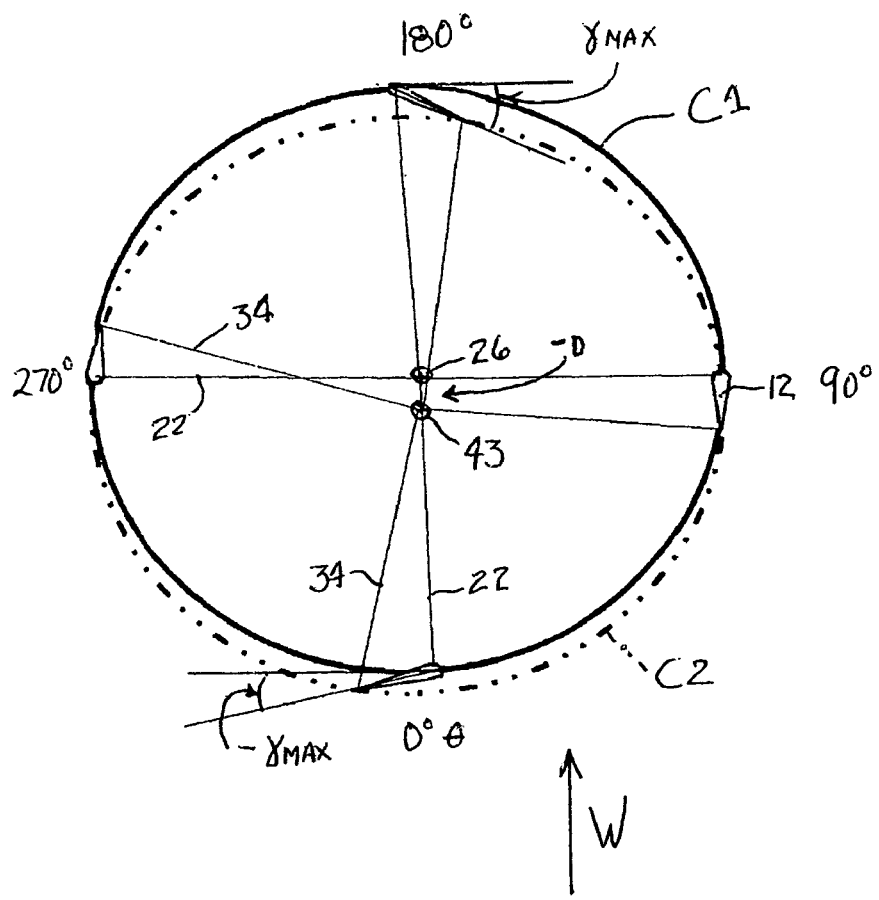
FIG. 7 shows a diagrammatic top plan view of the airfoils of the present invention having a negative gamma setting.

As seen in FIG. 7, adjustment mechanism 37 has changed the relative positions of axes 26 and 43, indicated as a −D therein, in order to provide for a negative angle gamma at the theta equals zero position. A small negative gamma was found to be of values in certain higher wind speed situations.

Figure 8:
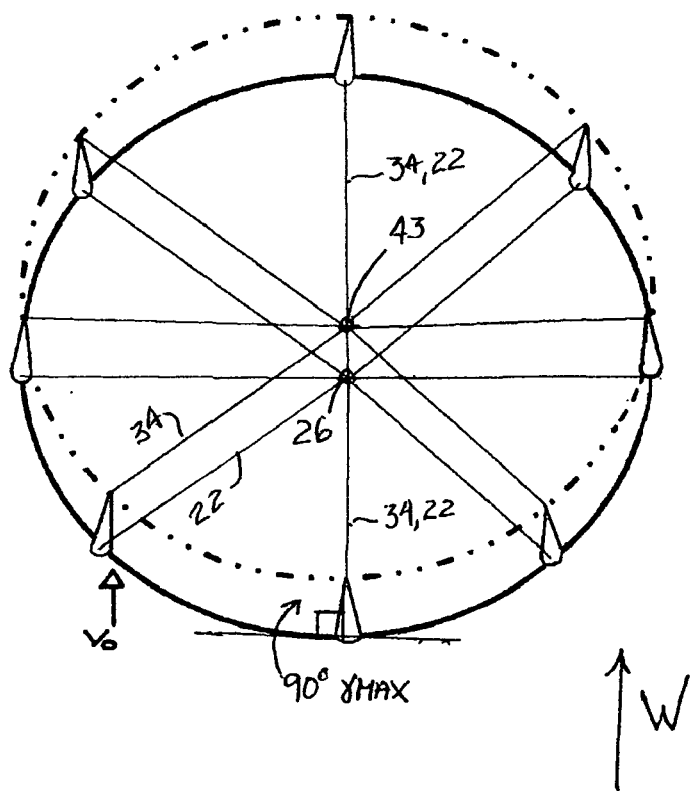
FIG. 8 shows a diagrammatic top plan view of the airfoils of the present invention in a safety stop mode.

As seen in FIG. 8, a gamma angle approaching 90 degrees is shown. Those of skill will appreciate that a pitch angle gamma of somewhat less than 90 degrees is desirable to insure that trailing edge spokes 34 are easily and reliably returned to a smaller gamma angle, i.e. do not go over 90 degrees and result in airfoils 12 rotating in an opposite or undesired direction resulting in interference with spokes 22. The maximum pitch angle gamma resulting from a particular distance of separation D of the axes of shafts 26 and 43, is a function thereof as well as of the chord length C, seen in FIG. 3. Specifically, the maximum pitch angle gamma is equal to the arcsine of D/C. In one embodiment airfoils 12 have a length of four feet and a bisecting line (BL) length of 6 inches and a chord length C of 4 inches. Adjustment device 37 has the capacity to set the distance to from the zero point thereof to a positive 3 inches D and to a slight negative distance D. The negative distance D provides for setting a negative gamma angle of up to approximately 6 degrees as referred to in the discussion above relative to FIG. 7.

The particular selection of the placement of airfoil leading edge pins 25 is typically at a point slightly ahead of the center of gravity or airfoils 12. This provides for suitable g-loading of the trailing edges 16 thereof under rotation to insure the desired outward directional movement thereof. Thus, leading edge pins 25 can be placed approximately one fourth of the distance from leading edge 14 along line BL. Trailing edge pins 35 can also be placed approximately one fourth of the distance from trailing edge 16 along line BL. Those of skill will appreciate that leading and trailing edge spokes 22 and 34 respectively can consist of rods, cables, channels stock and the like sufficient to effect the positioning and movement of airfoils 12. Where cables are used the g-loading is particularly useful to maintain a taut condition thereof. Spring mechanism 27, as seen in FIG. 3, serve to maintain pressure serving to also provide for correct positioning the trailing edges 16 of airfoils 12.

Figure 9:
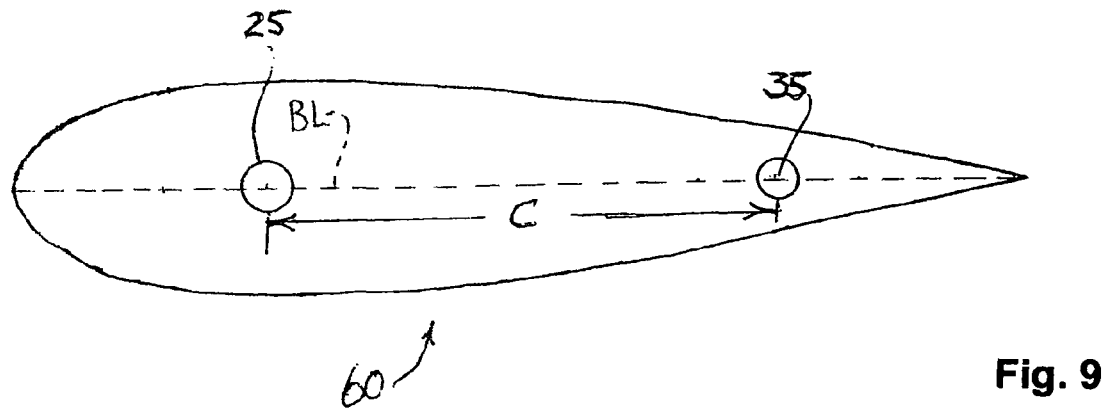
FIG. 9 shows a top plan cross-sectional view of a preferred category of airfoil.
Figure 10:
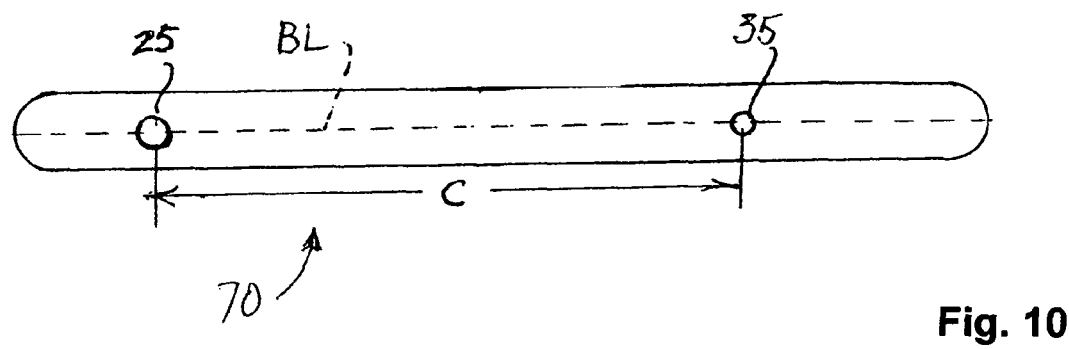
FIG. 10 shows a top plan cross-sectional view of a further category of airfoil.
Figure 11:
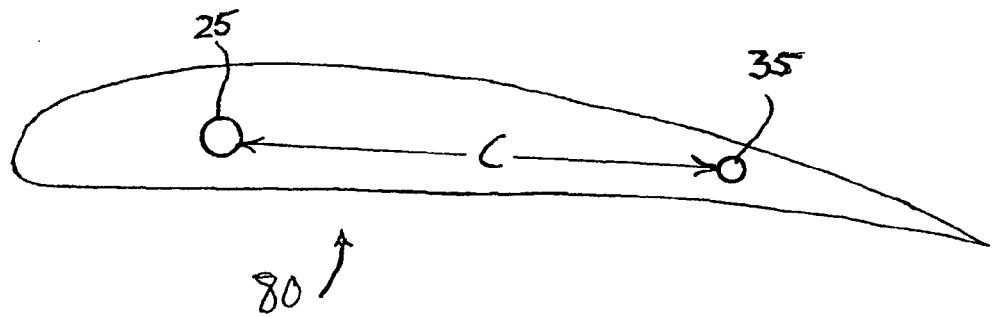
FIG. 11 shows a top plan cross-sectional view of a further category of airfoil.

It can be understood by those of skill that a variety of airfoils are usable with the present invention. As seen by referring to FIGS. 9, 10 and 11, various airfoil geometries are shown and are illustrative of skill of some of the major classifications thereof. The preferred embodiment 60 is seen in FIG. 9 and referred to as a symmetric airfoil. Specifically, a symmetrical airfoil such as NACA0018, provides for good lift and a relatively reduced stall region. A flat foil 70 is seen in FIG. 11 and could be used though not as efficiently as airfoil 60. Arcuate foil 80 can work well but is more costly to produce and can present more drag.

Figure 12:
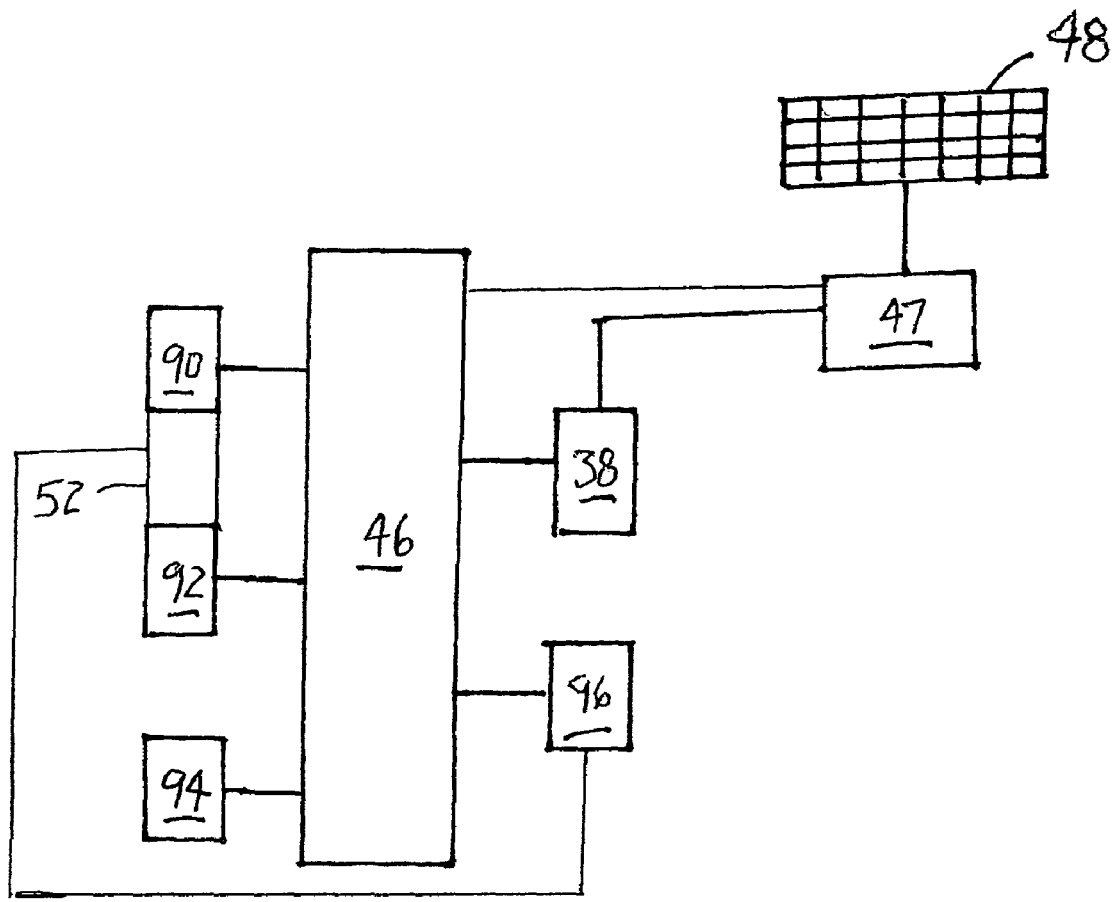
FIG. 12 shows a schematic diagram of the electronic control of the present invention.

As seen by referring to FIG. 12, electronic control mechanism 46 receives inputs from sensor 52 which includes a carousel rotation sensor 90 and a load sensor 92, Control 46 also receives data from a wind speed sensor 94, such as an anemometer. Preferably, this data is provided to control 46 wirelessly. Control 46 therefore regulates the offset distance D by operation of adjustment mechanism 37, and hence, the value of the angle gamma. Adjustment mechanism 37 can comprise a screw motor and it and control 46 are powered by battery 47. Battery 47 is preferably charged by solar cells 48. Control 46 and sensor 52 both serve to operate a carousel braking mechanism 96 to slow or stop carousel 28.

With data as to the rotational speed of carousel 28, the speed of the current wind as well as the nature of the load on driven device 30, such as an electrical generator, control 46 can appropriately regulate the offset D and hence the angle gamma. At startup with a zero carousel rotation speed and in a wind of sufficient strength to affect carousel rotation, control 46 will signal for a relatively large gamma angle, generally on the order of 45 degrees. A large gamma angle will be understood to create sufficient lift to initiate rotation. Once rotation has been achieved, control 46 will signal adjustment mechanism to reduce offset D and thus the gamma angle. It will be appreciated that while a large gamma produces lift In order to initiate rotation, it is done at the expense of a proportionally large amount of aerodynamic drag. This drag will limit the maximum achievable carousel rotational speed for a given wind speed, thus reduction of the angle gamma will reduce drag and permit faster rotation and larger wind energy harvest.

A problem for all wind generators concerns over speed conditions in high winds. In the present invention airfoil leading edge or tip rotational speeds can be up to a factor of 10 that of the existing wind speed. Thus, if a wind speed is encountered that would cause excessively fast rotation and to much stress on the various components of the invention herein, control 46 can reduce speed by placing a load on driven device 30 and/or by increasing the gamma angle to increase drag and slow rotation. If those strategies are not sufficient to maintain rotation speed below a designed safety limit, brake mechanism 96 can be engaged by either control 46 or sensor 52 for as a redundant precaution. A further strategy for wind speed reduction, and particularly in very high wind speeds where survival of the turbine structure is the goal, as opposed to any energy extraction, is to set airfoils 12 to a gamma angle of nearly 90 degrees as previously shown in FIG. 8. Those of skill will appreciate that at this angle all airfoils 12 will be essentially parallel with the wind and provide no lift, and hence, little or no rotation.

Figure 13:
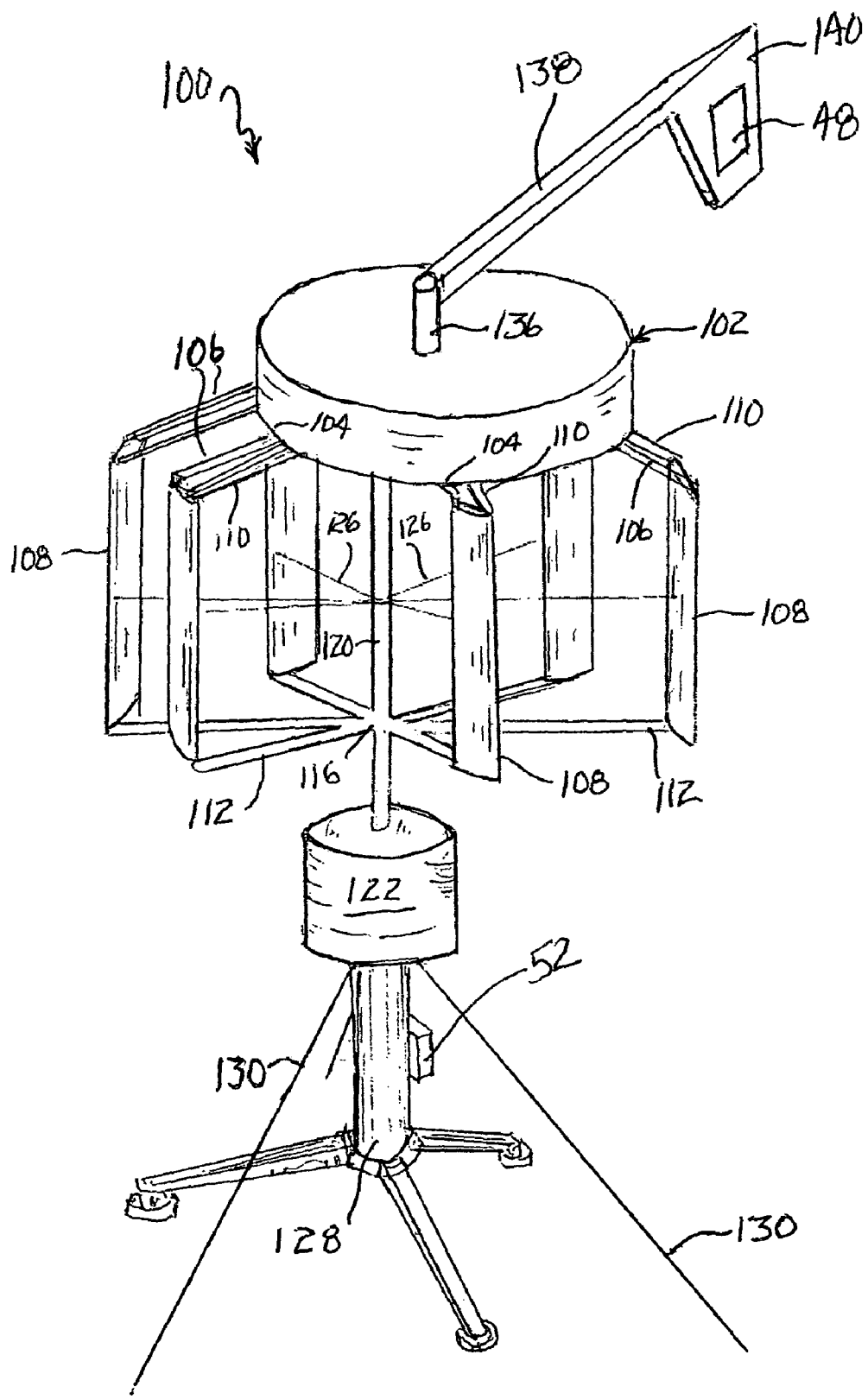
FIG. 13 shows a perspective view of an alternative embodiment of the present invention.
Figure 14:
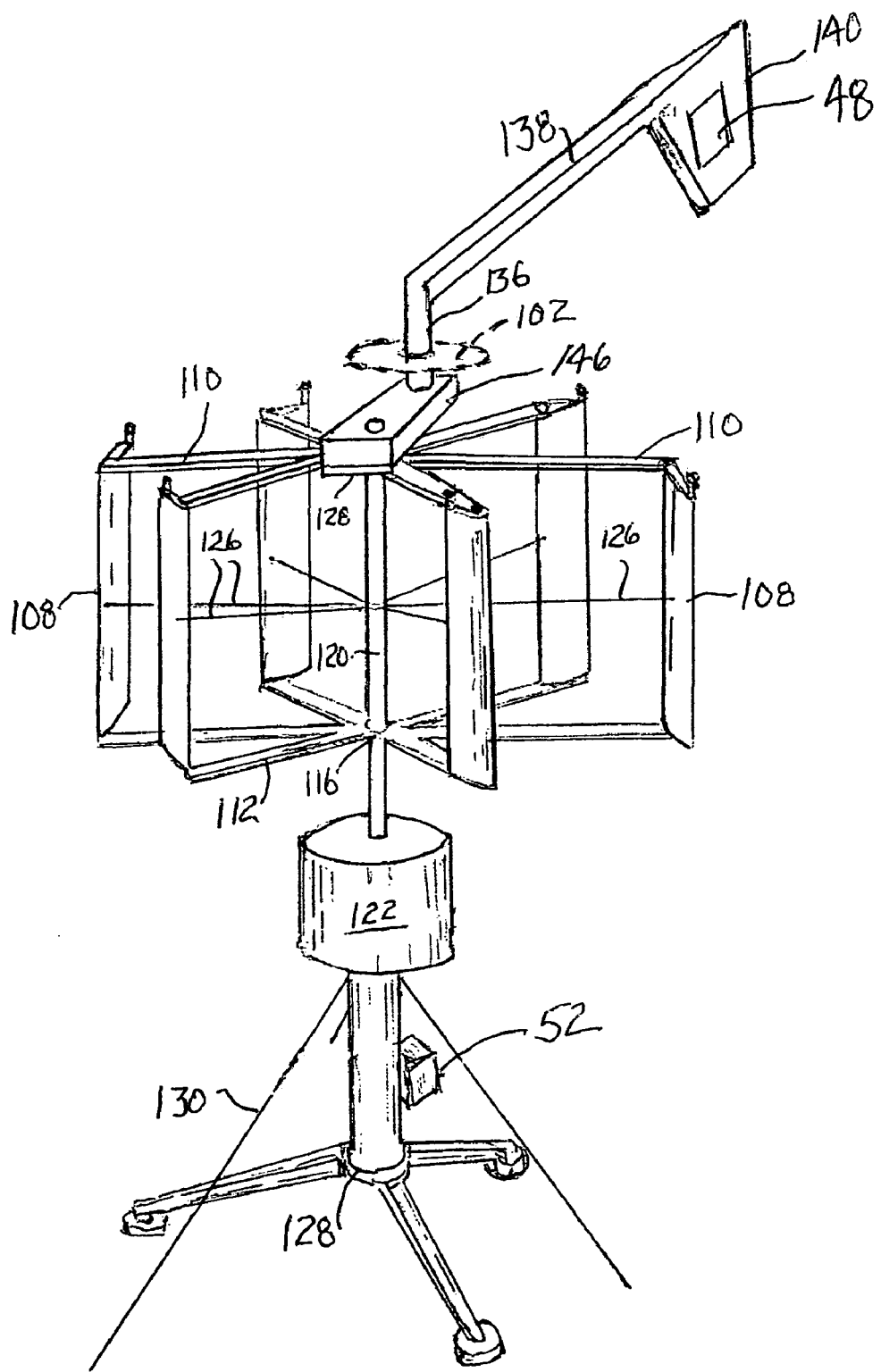
FIG. 14 show a perspective cut away view of the embodiment of FIG. 11 having the upper housing removed.
Figure 15:
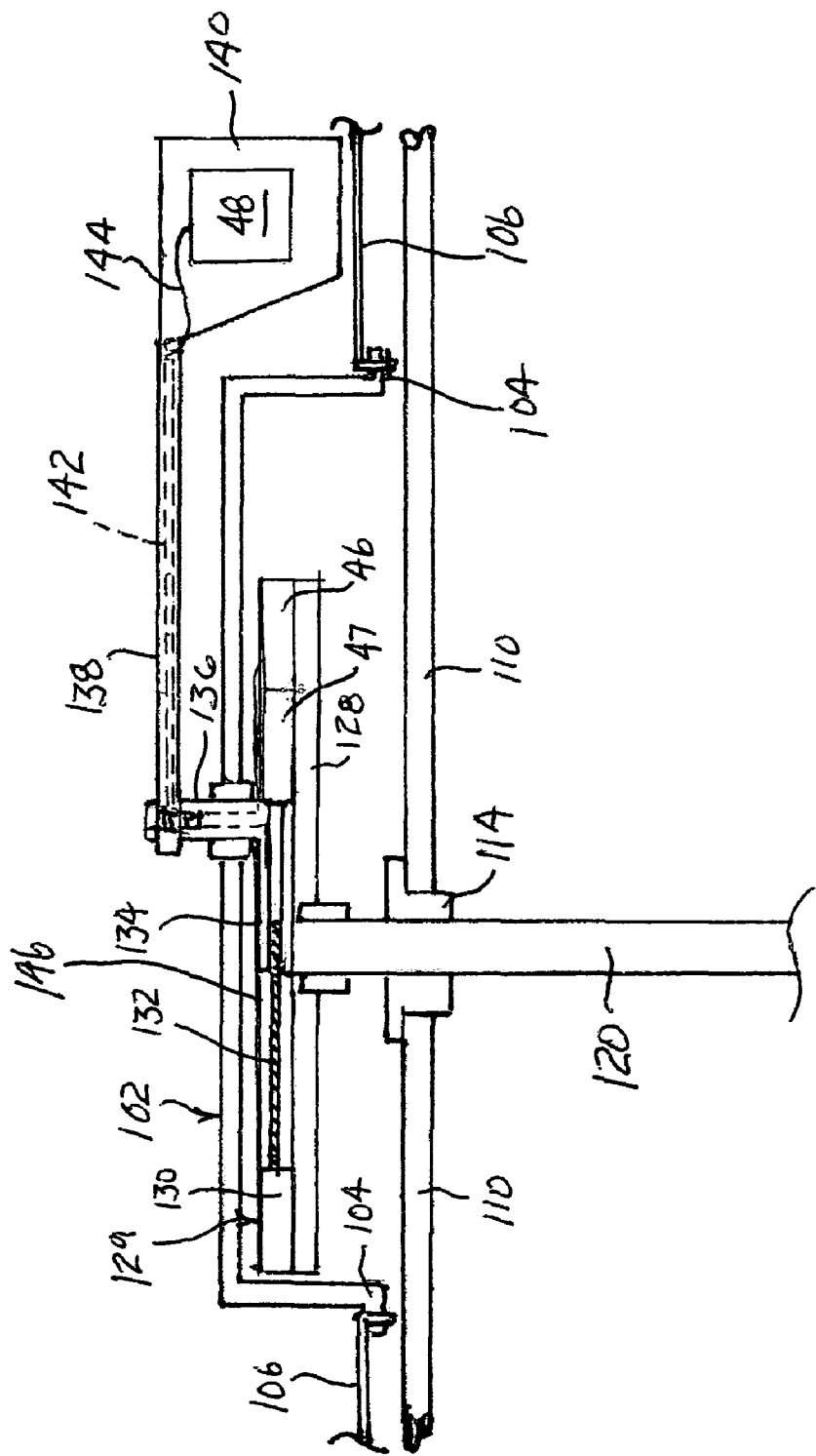
FIG. 15 shows an enlarged cross-sectional view of the embodiment shown in FIG. 13.

As seen by now referring to FIGS. 13, 14 and 15, a further embodiment of the present invention is seen and generally referred to by the numeral 100. Wind turbine 100 works in essentially the same manner as previously described turbine 10 and generally has the same arrangement of parts. However, turbine 100 includes a protective housing 102 that defines an interior area 103 and includes a plurality of feet 104 that are attached to angle adjustment rods 106. Rods 106 are pivotally secured to trailing edge ends of airfoils 108. Airfoils 108 are pivotally secured on their top and bottom leading edge ends to upper spokes 110 and lower spokes 112. Upper and lower spokes 110 and 112 emanate there from and are integral with their respective spoke hubs 114 and 116 respectively. Hubs 114 and 116 are secured to a central shaft 120 which is connected to a driven device 122, such as, an electric generator, refrigeration compressor, water pump, air pump or the like. Airfoil retaining wires 126 are secured to shaft 120 and to airfoils 108 to provide for additional structural strength due to stresses encountered thereby as the result of the centrifugal forces experienced by airfoils 108 during rotation thereof. A base 128 and base support wires 130 provide for support of driven device 122 and turbine 100 to an above ground position to avoid low level turbulence and as a safety precaution to prevent human or animal interference with the rotational movement of turbine 100.

As seen by specifically referring to FIG. 15, a horizontal support plate 128 is pivotally mounted on shaft 120 so that shaft 120 rotates independently thereof and is positioned within space 103. Plate 128 supports thereon an angle adjustment screw motor device 129. Adjustment device 129 includes a drive motor, 130, a driven threaded screw 132 and a threaded carrier 134. Carrier 134 includes a shaft 136 extending vertically through a central opening of housing 102 and secured to a rudder arm 138. Arm 138 is secured to a rudder 140 and includes a conduit shaft 142 through which wires 144 extend from photovoltaic solar cell array 48 to battery 47. Control 46 and battery 47 are also supported on plate 128. A secondary housing 146 serves to protect adjustment mechanism 129, control 46 and battery 47.

Wind turbine 100 works in substantially the same manner as previously described herein for Turbine 10. Thus, adjustment mechanism 129 is operated by control 46 to set an appropriate axial separation distance D between the axis of rotation defined by central shaft 120 and that defined by carrier shaft 136. The difference between the two embodiments concerns the structure of housing or hub 102 providing a strategy or structure for providing a relatively increased interior area for retaining and protecting adjustment mechanism 129 and its associated control 46 and battery 47. Those of skill will appreciate that embodiment 100 as well as embodiment 10 are shown as rotating about a vertical axis but that rotation about a horizontal axis or, in fact, a plurality of axes extending about an arc of 360 degrees is possible.

While embodiments of the invention have been described in detail, various modification and other embodiments thereof may be devised by one skilled in the art without departing from the spirit and scope of the invention, as defined in the appended claims.

What is claimed is:

1. A wind turbine, comprising:
a plurality of airfoils each having first and second ends and leading and trailing edges, the airfoils each pivotally secured on their first end to first spoke arms extending from a first hub and each airfoil pivotally secured on their second ends to second spoke arms extending from a second hub, the first and second arms both secured to leading edge points along the airfoil first and second ends respectively adjacent the leading edges thereof so that the airfoils pivot there about, and the first and second hubs secured to opposite ends of a central drive shaft so that the airfoils, first and second arms and first and second hubs form a carousel having an axis of rotation defined by the central shaft, a trailing edge hub having a plurality of trailing edge arms each pivotally secured to the first ends of an airfoil at a point thereon displaced from the upper spoke arm leading edge point of attachment towards the trailing edge thereof, an adjustment mechanism for moving a central axis of the trailing edge hub with respect to the axis of rotation of the carousel during rotation of the carousel so that rotation thereof results in motion of the airfoils to maximize lift as the airfoils rotate both in an upwind direction and in a downwind direction.

2. The turbine as defined in claim 1 and the adjustment mechanism pivotally mounted between the trailing edge hub and the first spoke hub.

3. The turbine as defined in claim 2 and including a rudder secured to the adjustment mechanism by a shaft extending centrally of the leading edge hub for adjusting movement of the airfoils relative to wind direction.

4. The turbine as defined in claim 1 and the airfoils having a symmetrical cross section.

5. The turbine as defined in claim 1 and the adjustment mechanism comprising an electrically operated screw motor.

6. The turbine as defined in claim 1 and including photovoltaic solar cells for powering the adjustment mechanism.

7. The turbine as defined in claim 6 and including a battery rechargeable by the solar cells and a control mechanism for operating the adjustment mechanism and the control and battery pivotally mounted with the adjustment mechanism between the trailing edge hub and the first spoke hub.

8. A wind turbine, comprising:
 a plurality of airfoils each having first and second ends and leading and trailing edges, the airfoils each pivotally secured on their first end to first spoke arms extending from a first hub and each airfoil pivotally secured on their second ends to second spoke arms extending from a second hub, the first and second arms both secured to leading edge points along the airfoil first and second ends respectively adjacent the leading edges thereof so that the airfoils pivot there about, a plurality of spring return mechanisms, each spring return mechanism attached to the first end of the airfoil and to the first spoke arm where the leading edge of the airfoil is pivotally secured to the first spoke arm to provide for correct positioning of the trailing edges of airfoils, and the first and second hubs secured to opposite ends of a central drive shaft so that the airfoils, first and second arms and first and second hubs form a carousel having an axis of rotation defined by the central shaft,
 a trailing edge hub having a plurality of trailing edge arms each pivotally secured to the first ends of an airfoil at a point thereon displaced from the upper spoke arm leading edge point of attachment towards the trailing edge thereof,
 an adjustment mechanism pivotally mounted between the first hub and the trailing edge hub for moving a central axis of the trailing edge hub with respect to the axis of rotation of the carousel during rotation thereof, the adjustment mechanism having a zero position wherein the axes of the central shaft and of the trailing edge hub are concentric so that the airfoils have a pitch angle of zero and where displacement of said axes by the adjustment mechanism creates an offset distance that determines a maximum pitch angle of the airfoils so that rotation of the carousel results in motion of the airfoils between positive and negative values of that maximum pitch angle during rotation of the carousel to maximize lift of the airfoils when rotating both in an upwind direction and in a downwind direction, and
 a rudder secured to the adjustment mechanism by a rudder shaft extending centrally of the central axis of the trailing edge hub for adjusting the position of the trailing edge hub so that the maximum positive pitch angle occurs with each airfoil when positioned on the carousel at a point thereon in a direct upwind facing orientation.

9. The turbine as defined in claim 8 and the airfoils having a symmetrical cross section.

10. The turbine as defined in claim 8 and the adjustment mechanism comprising an electrically operated screw motor.

11. The turbine as defined in claim 8 and including photovoltaic solar cells for powering the adjustment mechanism.

12. The turbine as defined in claim 8 and including a battery rechargeable by the solar cells, a control mechanism for operating the adjustment mechanism, a sensor, a wind speed sensor, and a carousel braking to slow or stop the carousel the sensor comprising a carousel rotation sensor and a load sensor the sensor wirelessly sending carousel rotation data and load data to the control mechanism and the wind speed sensor wirelessly sending wind speed data to the control mechanism, the control mechanism wirelessly receiving and using the carousel rotation data, load data and wind speed data to regulate the offset distance and airfoil pitch angle and to engage the braking mechanism to slow or stop the carousel to maximize wind energy harvest and reduce stress on the turbine components and the control and battery pivotally mounted with the adjustment mechanism between the trailing edge hub and the first spoke hub.

* * * * *